(12) United States Patent
Itaya

(10) Patent No.: US 9,600,003 B2
(45) Date of Patent: Mar. 21, 2017

(54) POWER-DISTRIBUTION-SYSTEM VOLTAGE CONTROL SYSTEM

(75) Inventor: Nobuhiko Itaya, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 426 days.

(21) Appl. No.: 14/371,196

(22) PCT Filed: Mar. 21, 2012

(86) PCT No.: PCT/JP2012/057213
§ 371 (c)(1),
(2), (4) Date: Jul. 9, 2014

(87) PCT Pub. No.: WO2013/140555
PCT Pub. Date: Sep. 26, 2013

(65) Prior Publication Data
US 2015/0005979 A1    Jan. 1, 2015

(51) Int. Cl.
*G05D 3/12* (2006.01)
*G05F 1/10* (2006.01)
(Continued)

(52) U.S. Cl.
CPC .............. *G05F 1/10* (2013.01); *G05B 15/02* (2013.01); *H02J 3/16* (2013.01); *H02J 13/0062* (2013.01);
(Continued)

(58) Field of Classification Search
CPC ........................................................ G05F 1/10
(Continued)

(56) References Cited

U.S. PATENT DOCUMENTS 3,543,548 A * 12/1970 Smith, Jr. ............. B21B 37/165
                                                        700/13
2005/0235174 A1* 10/2005 Curt .................... G05B 23/0224
                                                        713/340
(Continued)

FOREIGN PATENT DOCUMENTS

JP      5-292670 A    11/1993
JP      6-269138 A     9/1994
(Continued)

OTHER PUBLICATIONS

Blaabjerg, Frede, et al. "Overview of control and grid synchronization for distributed power generation systems." IEEE Transactions on industrial electronics 53.5 (2006): pp. 1398-1409.*
(Continued)

*Primary Examiner* — Satish Rampuria
(74) *Attorney, Agent, or Firm* — Buchanan Ingersoll & Rooney PC

(57) ABSTRACT

A cooperative voltage sensor (CVS) issues a target voltage change request when a voltage moving average at an end thereof deviates from a proper voltage upper or lower limit value. A cooperative voltage controller (CVC) also can issue a target voltage change request when a voltage moving average at an end thereof deviates from the proper voltage upper or lower limit value. The target voltage change request issued by the cooperative voltage sensor (CVS) or the cooperative voltage controller (CVC) is transferred between cooperative voltage controllers (CVCs) via a communication network and notified to all the cooperative voltage controllers (CVCs), and a cooperative operation of voltage control is realized.

16 Claims, 8 Drawing Sheets

(51) Int. Cl.
*H02J 3/16* (2006.01)
*H02J 13/00* (2006.01)
*G05B 15/02* (2006.01)
*H02J 3/38* (2006.01)

(52) U.S. Cl.
CPC ............. *H02J 3/383* (2013.01); *Y02E 10/563* (2013.01); *Y02E 40/34* (2013.01); *Y02E 40/72* (2013.01); *Y02E 40/74* (2013.01); *Y02E 60/726* (2013.01); *Y02E 60/7838* (2013.01); *Y04S 10/123* (2013.01); *Y04S 10/22* (2013.01); *Y04S 10/24* (2013.01); *Y04S 40/124* (2013.01)

(58) Field of Classification Search
USPC .................................................. 700/286–306
See application file for complete search history.

(56) References Cited

U.S. PATENT DOCUMENTS

| | | | | |
|---|---|---|---|---|
| 2005/0273183 | A1* | 12/2005 | Curt | H02J 13/0006 700/22 |
| 2009/0265042 | A1* | 10/2009 | Mollenkopf | H02J 3/12 700/298 |
| 2013/0163139 | A1* | 6/2013 | Kashyap | H01L 29/36 361/111 |

FOREIGN PATENT DOCUMENTS

| | | |
|---|---|---|
| JP | 7-336890 A | 12/1995 |
| JP | 9-322404 A | 12/1997 |
| JP | 11-289663 A | 10/1999 |
| JP | 11-332103 A | 11/1999 |
| JP | 2005-269744 A | 9/2005 |
| JP | 2006-325380 A | 11/2006 |
| JP | 2007-074846 A | 3/2007 |
| JP | 2009-065788 A | 3/2009 |
| JP | 2010-183701 A | 8/2010 |

OTHER PUBLICATIONS

Yoshida, Hirotaka, et al. "A particle swarm optimization for reactive power and voltage control considering voltage security assessment." IEEE Transactions on power systems 15.4 (2000): pp. 1232-1239.*

Senjyu, Tomonobu, et al. "Optimal distribution voltage control and coordination with distributed generation." IEEE Transactions on Power Delivery 23.2 (2008): pp. 1236-1242.*

International Search Report (PCT/ISA/210) mailed on Nov. 27, 2012, by the Japanese Patent Office as the International Searching Authority for International Application No. PCT/JP2012/057213.

Written Opinion (PCT/ISA/237) mailed on Nov. 27, 2012, by the Japanese Patent Office as the International Searching Authority for International Application No. PCT/JP2012/057213.

* cited by examiner

POWER-DISTRIBUTION-SYSTEM VOLTAGE CONTROL SYSTEM

FIELD

The present invention relates to a power-distribution-system voltage control system that controls voltage of a power distribution system.

BACKGROUND

In general, a power distribution system is composed of a high-voltage system (e.g., 3300 volts to 6600 volts) and a low voltage system (e.g., 100 volts to 200 volts). A power receiving end of a general consumer is connected to the low voltage system. A power company is obliged to maintain voltage at the power receiving end of the general consumer within a proper range (e.g., in the case of power reception of 100 volts, maintain the voltage at 95 volts to 107 volts). Therefore, the power company maintains voltage at the power receiving end of the general consumer by adjusting a control amount of a power control apparatus (e.g., an LRT (Load Ratio control Transformer) or an SVR (Step Voltage Regulator)) connected to the high-voltage system. Note that the voltage of the voltage control apparatus is controlled by a voltage controller integrated with or in parallel with the voltage control apparatus, for example.

The voltage control apparatus of a transformer type such as the LRT or the SVR has an object of keeping the voltage at all points on a load side within a proper range by changing the voltage on the load side according to tap operation based on LDC (Line Drop Compensator) control. The LDC control calculates, on the basis of voltage/current information measured by the voltage control apparatus and on the estimate that a load of a power distribution line is larger and the voltage at the end of the power distribution line is lower as an electric current is larger, a reasonable load side voltage for keeping the voltage at all the points on the load side within the proper range.

Incidentally, the LDC control is configured on the premise that a load distribution of the power distribution system equally changes, that is, the voltage at respective points of the power distribution system change in the same direction. However, in recent years, according to the diversification of use of electricity and the spread of distributed power supplies by solar power generation or the like, the load distribution of the power distribution system tends to greatly fluctuate according to elapse of time. Therefore, it is difficult to estimate a voltage state of the entire power distribution system only from the voltage/current information measured by the voltage control apparatus, and a problem arises in maintaining a proper voltage.

Therefore, a mechanism has been developed in which measurement information of voltage/electric current at respective points of a power distribution system is gathered in a central device (a centralized voltage controller) via a communication network and collectively grasped and the centralized voltage controller instructs a voltage controller about a target voltage (see, for example, Patent Literature 1).

Note that, to prevent wear of the apparatus, in general, the voltage control apparatus of the transformer type keeps the number of tap changes below 30 taps per one day in average.

To cope with sudden fluctuation in voltage accompanying change of a solar power generation amount due to a flow of cloud, application of a voltage control apparatus of a reactive power adjustment type such as an SVC (Static Var Compensator) or a power conditioning system (hereinafter referred to as PCS) to a power generation system also has been examined. Concerning the voltage control apparatus of the reactive power adjustment type, costs and setting places increase when a capacity (VA) is increased, and thus it alone is not suitable for coping with large voltage fluctuation in the power distribution system and a basic way of use thereof is absorption of voltage fluctuation in units of second.

However, even if a capacity is small, it is expected to cope with large voltage fluctuation in time order equal to or longer than 1 minute by causing a plurality of the voltage control apparatuses of the reactive power adjustment type to operate in cooperation with one another from the centralized voltage controller. For example, if PCSs are essential for solar power generation, it is also expected that utilizing such cooperative control among the PCSs eliminates the need to take an additional measure against the voltage problem such as setting of another SVC.

In this way, in a situation in which a plurality of voltage control apparatuses are set on one power distribution line, to realize a cooperative operation among the voltage control apparatuses, it is expected to develop a mechanism for grasping a voltage state of the entire power distribution system with the centralized voltage controller and sending an appropriate command to the voltage controllers and apply the mechanism to the power distribution system.

CITATION LIST

Patent Literature

Patent Literature 1: Japanese Patent Application Laid-Open No. H11-289663

SUMMARY

Technical Problem

However, the centralized voltage controller needs to periodically collect voltage/current information at the respective points of the power distribution system. Because the number of points is enormous, to cope with large voltage fluctuation in several ten seconds to several minutes, a high-speed communication network such as an optical communication network is necessary. A high-speed server or the like is necessary for the centralized voltage controller. Further, it is necessary to secure a setting place, maintain operation, and perform equipment data maintenance for the centralized voltage controller. In installing the centralized voltage controller, a scale merit is necessary. For example, it is necessary to set a system in about every prefecture.

On the other hand, at the present time, there is only a limited number of power distribution systems that actually need the centralized voltage control. Although it is expected that the number of such power distribution systems will considerably increase in twenty years in future, a ratio of the number of such power distribution systems to the number of all power distribution systems is anticipated to remain small.

Therefore, there is a demand for a voltage control system that enables small start, requires only small operation maintenance costs, and does not use a centralized voltage controller and a high-speed communication network.

The present invention has been devised in view of the above and it is an object of the present invention to provide a power-distribution-system voltage control system that realizes cooperated voltage control among a plurality of voltage controllers without using a centralized voltage controller.

Solution to Problem

To solve the above-mentioned object and achieves the purpose, a power-distribution-system voltage control system according to the present invention includes a plurality of voltage control apparatuses connected to a high-voltage power distribution line connected to a transformer for power distribution and a low-voltage power distribution line connected to the high-voltage power distribution line via a transformer, the voltage control apparatuses each controlling voltage; voltage controllers connected to the respective voltage control apparatuses, each of the voltage controllers acquiring, at every fixed cycle, a voltage measurement value at an end thereof measured by the corresponding voltage control apparatus and storing the voltage measurement value for a fixed period, adjusting a control amount of the corresponding voltage control apparatus such that the voltage measurement value is maintained within a range between a target voltage upper limit value and a target voltage lower limit value set in advance, being capable of generating and sending target voltage change request information for requesting the voltage controllers other than itself to change respective target voltage upper limit values and target voltage lower limit values when a latest voltage moving average calculated using a latest voltage measurement value and stored voltage measurement values deviates from a range between a proper voltage upper limit value and a proper voltage lower limit value, and changing the target voltage upper limit value and the target voltage lower limit value thereof according to content of target voltage change request information when the voltage controller receives the target voltage change request information from an outside thereof or itself generates the target voltage change request information; a plurality of voltage sensors connected to at least the high-voltage power distribution line, each of the voltage sensors measuring voltage at an end thereof at every fixed cycle and storing a voltage measurement value for a fixed period and generating and transmitting target voltage change request information for requesting the voltage controllers to change the respective target voltage upper limit values and the respective target voltage lower limit values when a latest voltage moving average calculated using a latest voltage measurement value and stored voltage measurement values deviates from a range between a proper voltage upper limit value and a proper voltage lower limit value set in advance; and a communication network connecting the voltage controllers and the voltage sensors to allow them to communicate with each other, wherein when the target voltage change request information is generated and sent in any of the voltage controllers and the voltage sensors, the target voltage change request information is transferred between the voltage controllers via the communication network to be spread over all the voltage controllers.

Advantageous Effects of Invention

The present invention exerts an effect of making it possible to realize cooperated voltage control among a plurality of voltage controllers without using a centralized voltage controller.

DESCRIPTION OF EMBODIMENTS

An embodiment of a power-distribution-system voltage control system according to the present invention is explained in detail below with reference to the drawings. Note that the present invention is not limited by the embodiment.

Embodiment

Figure 1:
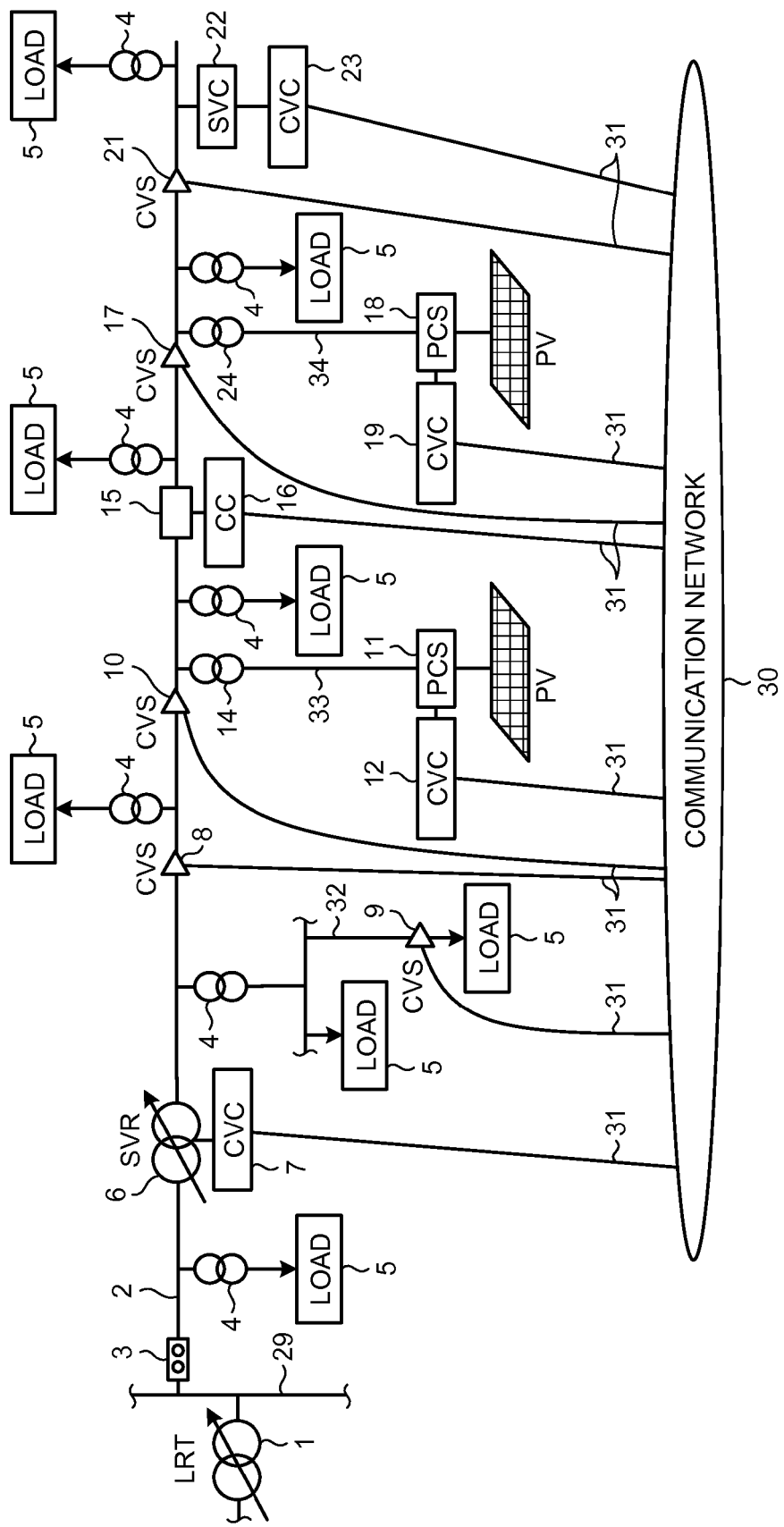
FIG. 1 is a diagram of an example of the configuration of a power-distribution-system voltage control system according to an embodiment.

FIG. 1 is a diagram of an example of the configuration of a power-distribution-system voltage control system according to an embodiment. In FIG. 1, a power distribution bank 1 includes an LRT (Load Ratio Control Transformer) functioning as a transformer for power distribution located in, for example, a transformer substation and a voltage controller that performs control of the LRT by controlling a tap position of the LRT.

A bus 29 is connected to a secondary side of the power distribution bank 1. A power distribution line 2 is connected to the bus 29. The power distribution line 2 is a high-voltage power distribution line of a high-voltage system (a voltage level is, for example, 3300 volts to 6600 volts). Note that, in the example shown in FIG. 1, one power distribution line 2 is connected. However, the configuration is similar when a plurality of the power distribution lines 2 is connected. One end of the power distribution line 2 is connected to the bus 29 via a breaker 3.

Cooperative voltage sensors (CVSs) 8, 10, 17, and 21 are connected to the power distribution line 2. The cooperative voltage sensors (CVSs) 8, 10, 17, and 21 can measure voltage in respective connecting places (ends) thereof. Note that, in this embodiment, voltage control of a power distribution system is performed on the basis of only voltage measurement values without using current measurement values. This is because, due to the spread of distributed power supplies such as solar power generation in recent years, it is likely that current measurement values are extremely small depending on measurement points and, in this case, the current measurement values have extremely large errors. The cooperative voltage sensors (CVSs) 8, 10, 17, and 21 are each connected to a communication network 30 via, for example, network cables 31.

For example, an SVR (Step Voltage Regulator) 6 for voltage drop compensation is connected to the power distribution line 2 as a voltage controller. A cooperative voltage controller (CVC) 7, which controls the SVR 6, is connected to the SVR 6. The cooperative voltage controller (CVC) 7 can be provided integrally with or in parallel with the SVR 6, for example. The cooperative voltage controller (CVC) 7 performs control of the SVR 6 by adjusting a control amount of the SVR 6, specifically, by adjusting a tap position. The SVR 6 also performs measurement of voltage and electric current in a connecting place (an end) of the power distribution line 2. The cooperative voltage controller (CVC) 7 is connected to the communication network 30 via, for example, the network cable 31.

A static var compensator (SVC) 22 is connected to the power distribution line 2 as a voltage controller. A cooperative voltage controller (CVC) 23, which controls the static var compensator (SVC) 22, is connected to the static var compensator (SVC) 22. The cooperative voltage controller (CVC) 23 can be provided integrally with or in parallel with the static var compensator (SVC) 22, for example. The cooperative voltage controller (CVC) 23 performs control of the static var compensator (SVC) 22 by adjusting a control amount of the static var compensator (SVC) 22, specifically, by adjusting a reactive power output. The static var compensator (SVC) 22 also performs measurement of voltage and electric current in the connecting place (the end) of the power distribution line 2. The cooperative voltage controller (CVC) 23 is connected to the communication network 30 via, for example, the network cable 31.

A switch 15 is provided on the power distribution line 2. In a state in which the switch 15 is closed, an upstream side (a power distribution system power supply side) and a downstream side (a power distribution system load side) of the switch 15 of the power distribution line 2 are electrically connected. However, in a state in which the switch 15 is open, the downstream side is disconnected from the upstream side. A connection controller (CC) 16 is connected to the switch 15. The connection controller (CC) 16 is connected to the communication network 30 via, for example, the network cable 31. In the state in which the switch is open, the connection controller (CC) 16 interrupts communication between cooperative voltage controllers (CVCs) 12 and 19. However, in the state in which the switch 15 is closed, the connection controller (CC) 16 relays the communication between the cooperative voltage controllers (CVCs) 12 and 19. That is, the connection controller (CC) 16 has a communication function and reflects the opening and closing state of the switch 15 in a communication path between the cooperative voltage controllers (CVCs) 12 and 19.

A power distribution line 32 having voltage lower than the voltage of the power distribution line 2 is connected to the power distribution line 2 via a transformer 4. A cooperative voltage sensor (CVS) 9 is connected to the power distribution line 32. The power distribution line 32 is a low-voltage power distribution line having a voltage level of, for example, 100 volts to 200 volts. The cooperative voltage sensor (CVS) 9 is connected to the communication network 30 via, for example, the network cable 31. A load 5 is connected to the power distribution line 32.

A power distribution line 33 having voltage lower than the voltage of the power distribution line 2 is connected to the power distribution line 2 via a transformer 14. The power distribution line 33 is a low-voltage power distribution line. A voltage level of the power distribution line 33 can be the same as or higher than the voltage level of the power distribution line 32. A power conditioning system (PCS) 11 for solar power generation is connected to the power distribution line 33 as a voltage controller. The cooperative voltage controller (CVC) 12, which controls the PCS 11, and a power generation source (PV) are connected to the PCS 11. The cooperative voltage controller (CVC) 12 is provided integrally with or in parallel with the PCS 11, for example. The cooperative voltage controller (CVC) 12 performs control of the PCS 11 by adjusting a control amount of the PCS 11, specifically, by adjusting a reactive power output. The PCS 11 also performs measurement of voltage and electric current of the power distribution line 33. The cooperative voltage controller (CVC) 12 is connected to the communication network 30 via, for example, the network cable 31.

A power distribution line 34 having voltage lower than the voltage of the power distribution line 2 is connected to the power distribution line 2 via a transformer 24. The power distribution line 34 is a low-voltage power distribution line. A voltage level of the power distribution line 34 can be the same as or higher than the voltage level of the power distribution line 32. A power conditioning system (PCS) 18 for solar power generation is connected to the power distribution line 34 as a voltage controller. The cooperative voltage controller (CVC) 19, which controls the PCS 18, and a power generation source (Pv) are connected to the PCS 18. The cooperative voltage controller (CVC) 19 can be provided integrally with or in parallel with the PCS 18, for example. The cooperative voltage controller (CVC) 19 performs control of the PCS 18 by adjusting a control amount of the PCS 18, specifically, by adjusting a reactive power output. The PCS 18 also performs measurement of voltage and electric current in a connecting place of the power distribution line 34. The cooperative voltage controller (CVC) 19 is connected to the communication network 30 via, for example, the network cable 31.

Note that the SVR 6 and the cooperative voltage controller (CVC) 7 and the PCS 11 and the cooperative voltage controller (CVC) 12 are connected to a portion of a power distribution line 8 on the power distribution system power supply side of the switch 15. The static var compensator (SVC) 22 and the cooperative voltage controller (CVC) 23 and the PCS 18 and the cooperative voltage controller (CVC) 19 are connected to a portion of the power distribution line 8 on the power distribution system load side of the switch 15. A plurality of cooperative voltage sensors (CVSs) are provided at least on the power distribution line 3 and can be further provided on the low-voltage power distribution lines. In the example shown in the figure, the cooperative voltage sensor (CVS) is also provided on the power distribution line 32, for example.

In this way, the cooperative voltage controllers (CVCs) are broadly classified into the cooperative voltage controller (CVC) 7 of the transformer type, which gives a command to the voltage control apparatus of the transformer type, and the cooperative voltage controllers (CVCs) 12, 19, and 23 of the reactive power type, each of which gives a command to the voltage control apparatus of the reactive power adjustment type. The voltage control apparatus of the transformer type has a voltage control characteristic in which the overall voltage on the power distribution system load side is increased or reduced according to a tap change but the voltage on the power distribution system power supply side is almost not increased or reduced. The voltage control apparatus of the reactive power adjustment type has a voltage control characteristic in which the overall voltage on the power distribution load side is increased or reduced according to a reactive electric energy change and the voltage on the power distribution system power supply side is increase or reduced in proportion to line impedance from the power distribution bank 1. Therefore, the voltage control apparatus of the reactive power adjustment type has a smaller voltage change width with respect to the same reactive electric energy change as the voltage control apparatus is closer to the power distribution bank 1.

The configuration of the cooperative voltage sensor (CVS) is explained. Note that, in the following explanation, for example, the cooperative voltage sensor (CVS) 8 is explained. The cooperative voltage sensor (CVS) 8 can perform measurement, editing, and monitoring of voltage, a target voltage change request, and the like. The measurement means measurement of voltage at the end of the cooperative voltage sensor (CVS) 8. The editing means, for example, calculating a voltage moving average in a fixed period. The monitoring means monitoring fluctuation in voltage. As explained below, the target voltage change request is issued when a latest voltage moving average deviates from a proper voltage upper or lower limit value.

Figure 2:
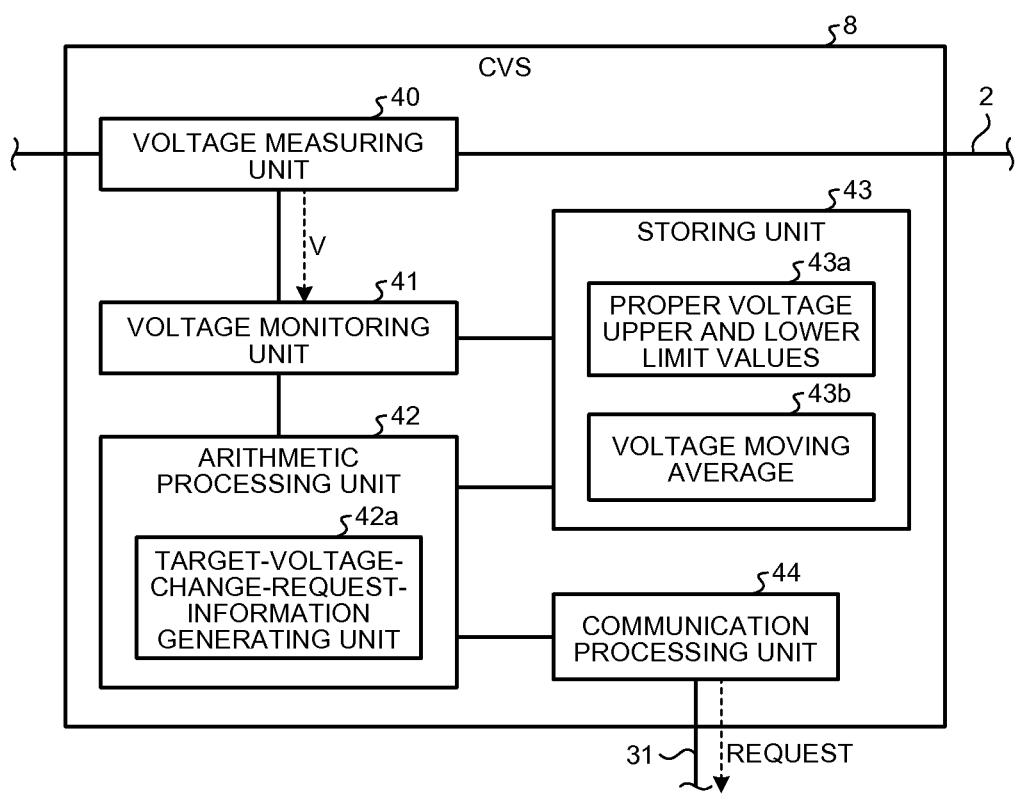
FIG. 2 is a diagram of an example of the configuration of a cooperative voltage sensor (CVS) 8.

FIG. 2 is a diagram of an example of the configuration of the cooperative voltage sensor (CVS) 8. As shown in FIG. 2, the cooperative voltage sensor (CVS) 8 includes a voltage measuring unit 40, a voltage monitoring unit 41, an arithmetic processing unit 42, a storing unit 43, and a communication processing unit 44.

The voltage measuring unit 40 is connected to the power distribution line 2 and measures voltage at the end of the voltage measuring unit 40 at, for example, every fixed cycle.

The voltage monitoring unit 41 monitors the voltage (V) measured by the voltage measuring unit 40. The voltage monitoring unit 41 acquires voltage measurement value information at, for example, every fixed cycle and sends the voltage measurement value information to the arithmetic processing unit 42.

The arithmetic processing unit 42 executes various kinds of arithmetic processing. Specifically, the arithmetic processing unit 42 stores a voltage measurement value output from the voltage monitoring unit 41 in the storing unit 43 for, for example, a fixed period. Every time the arithmetic processing unit 42 acquires a latest voltage measurement value from the voltage monitoring unit 41, the arithmetic processing unit 42 calculates a voltage moving average 43*b* using a past voltage measurement value already stored in the storing unit 43 and a latest voltage measurement value and stores the voltage moving average 43*b* in the storing unit 43 for, for example, a fixed period. Proper voltage upper and lower limit values 43*a* are stored in the storing unit 43 in advance. The proper voltage upper and lower limit values 43*a* include a proper voltage upper limit value and a proper voltage lower limit value and specify a proper voltage range that should be maintained with respect to a predetermined section of the power distribution line 8 including a voltage measurement point of the cooperative voltage sensor (CVS) 8. Note that the proper voltage upper and lower limit values 43*a* can be set variably also in time.

The arithmetic processing unit 42 has a function of issuing a target voltage change request other than the arithmetic processing function. That is, the arithmetic processing unit 42 includes a target-voltage-change-request-information generating unit 42*a*. The arithmetic processing unit 42 generates, with the target-voltage-change-request-information generating unit 42*a*, target voltage change request information when the latest voltage moving average 43*b* deviates from the range between the proper voltage upper and lower limit values 43*a*. The arithmetic processing unit 42 transmits the target voltage change request information to a predetermined cooperative voltage controller (CVC), for example, the cooperative voltage controller (CVC) 12 via the communication processing unit 44. Note that the target voltage change request information includes a change amount of voltage and a changing direction. Target voltage upper and lower limit values are set for each of the cooperative voltage controllers (CVCs). The cooperative voltage controllers (CVCs) carry out voltage control to maintain voltage within a range between these values. When the cooperative voltage controllers (CVCs) receive a target voltage change request, the cooperative voltage controllers (CVCs) change the target voltage upper and lower limit values according to content of the request and reset the target voltage upper and lower limit values.

The communication processing unit 44 is connected to the network cable 31 and executes communication processing.

Note that the configuration explained above is the same concerning the cooperative voltage sensors (CVSs) 10, 17, and 21. In FIG. 2, by changing the power distribution line 2 to the power distribution line 32, the same configuration applies to the cooperative voltage sensor (CVS) 9.

The configuration of the cooperative voltage controller (CVC) is explained. The cooperative voltage controller (CVC) performs collection, editing, and monitoring of a voltage measurement value from the voltage controller, a target voltage value command to the voltage controller, and the like. The cooperative voltage controller (CVC) has a function of performing a target voltage change request. The collection means acquiring, from the voltage controller, a voltage value at the end thereof measured by the voltage controller at, for example, every fixed cycle. The editing means, for example, calculating a voltage moving average in, for example, a fixed period on the basis of the collected voltage measurement values. The monitoring means monitoring voltage fluctuation. The target voltage value command is a command output to the voltage controller to keep the voltage at the end within target voltage upper and lower limit values. The target voltage change request is issued when a latest voltage moving average deviates from a proper voltage upper or lower limit value.

Figure 3:
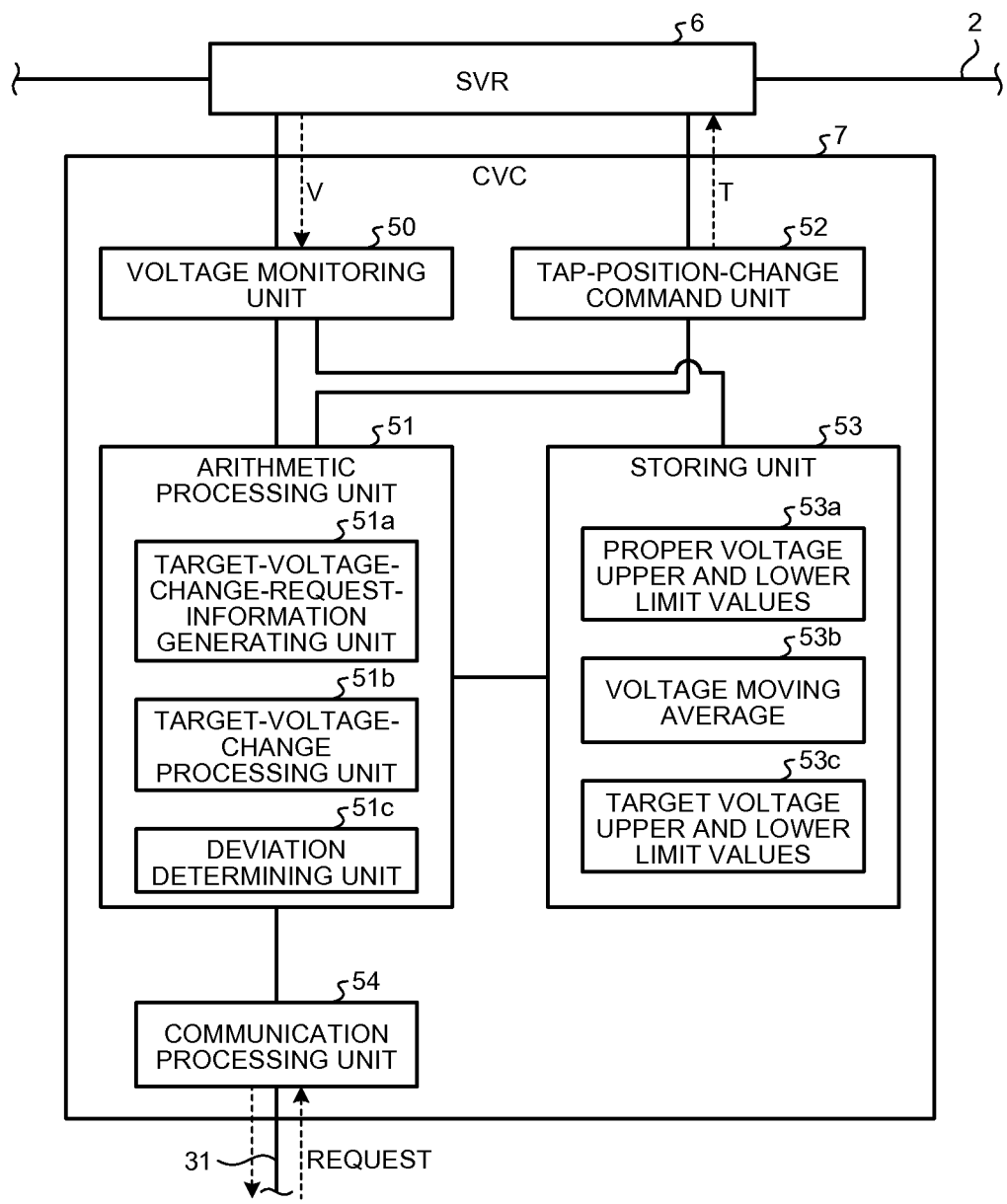
FIG. 3 is a diagram of an example of the configuration of a cooperative voltage controller (CVC) 7.

FIG. 3 is a diagram of an example of the configuration of the cooperative voltage controller (CVC) 7. As shown in FIG. 3, the cooperative voltage controller (CVC) 7 includes a voltage monitoring unit 50, an arithmetic processing unit 51, a tap-position-change command unit 52, a storing unit 53, and a communication processing unit 54.

The voltage monitoring unit 50 monitors voltage (V) measured by the SVR 6, acquires voltage measurement information at, for example, every fixed cycle, and sends the voltage measurement information to the arithmetic processing unit 51.

The arithmetic processing unit 51 executes various kinds of arithmetic processing. Specifically, the arithmetic processing unit 51 stores a voltage measurement value output from the voltage monitoring unit 50 in the storing unit 53 for, for example, a fixed period. Every time the arithmetic processing unit 51 acquires a latest voltage measurement value from the voltage monitoring unit 50, the arithmetic processing unit 51 calculates a voltage moving average 53*b* using a past voltage measurement value already stored in the storing unit 53 and a latest voltage measurement value and stores the voltage moving average 53*b* for, for example, a fixed period. Proper voltage upper and lower limit values 53*a* are stored in the storing unit 53 in advance. The proper voltage upper and lower limit values 53*a* include a proper voltage upper limit value and a proper voltage lower limit value and specify a proper voltage range that should be maintained with respect to a predetermined section of the power distribution line 2 including a voltage measurement point of the SVR 6. Note that the proper voltage upper and lower limit values 53*a* can be set variably also in time.

Target voltage upper and lower limit values 53c are stored in the storing unit 53 in advance. The target voltage upper and lower limit values 53c are a target voltage upper limit value and a target voltage lower limit value that specify a control target voltage range of the cooperative voltage controller (CVC) 7.

The arithmetic processing unit 51 includes a target-voltage-change-request-information generating unit 51a. The target-voltage-change-request-information generating unit 51a generates target voltage change request information when the latest voltage moving average 53b deviates from the range between the proper voltage upper and lower limit values 53a. The target voltage change request information includes a change amount of voltage and a changing direction. The arithmetic processing unit 51 transmits the target voltage change request information to a predetermined cooperative voltage controller (CVC), for example, the cooperative voltage controller (CVC) 12 via the communication processing unit 44. Note that it is also possible that the target-voltage-change-request-information generating unit 51a is not provided in the cooperative voltage controller (CVC) of the transformer type, a function of the target-voltage-change-request-information generating unit 51a is disabled according to the configuration of the power distribution system, or the generated target voltage change request information is not transmitted.

The arithmetic processing unit 51 includes a target-voltage-change processing unit 51b. When the target-voltage-change processing unit 51b receives target voltage change request information from another cooperative voltage controller (CVC) or the cooperative voltage sensor (CVS), the target-voltage-change processing unit 51b updates and resets the target voltage upper and lower limit values 53c of the storing unit 53 on the basis of a voltage change amount and a changing direction included in the target voltage change request information.

The arithmetic processing unit 51 includes a deviation determining unit 51c. The deviation determining unit 51c determines whether a voltage measurement value output from the voltage monitoring unit 50 at, for example, every predetermined cycle is within a range between the target voltage upper and lower limit values 53c. When the voltage measurement value deviates from the range, the deviation determining unit 51c generates a voltage command to maintain voltage within the target voltage upper and lower limit values 53c and outputs the voltage command to the tap-position-change command unit 52. The tap-position-change command unit 52 outputs the voltage command to the SVR 6 as a tap position change command. The SVR 6 adjusts a tap position T according to the tap position change command to perform control of voltage.

The communication processing unit 54 is connected to the network cable 31 and executes communication processing.

Figure 4:
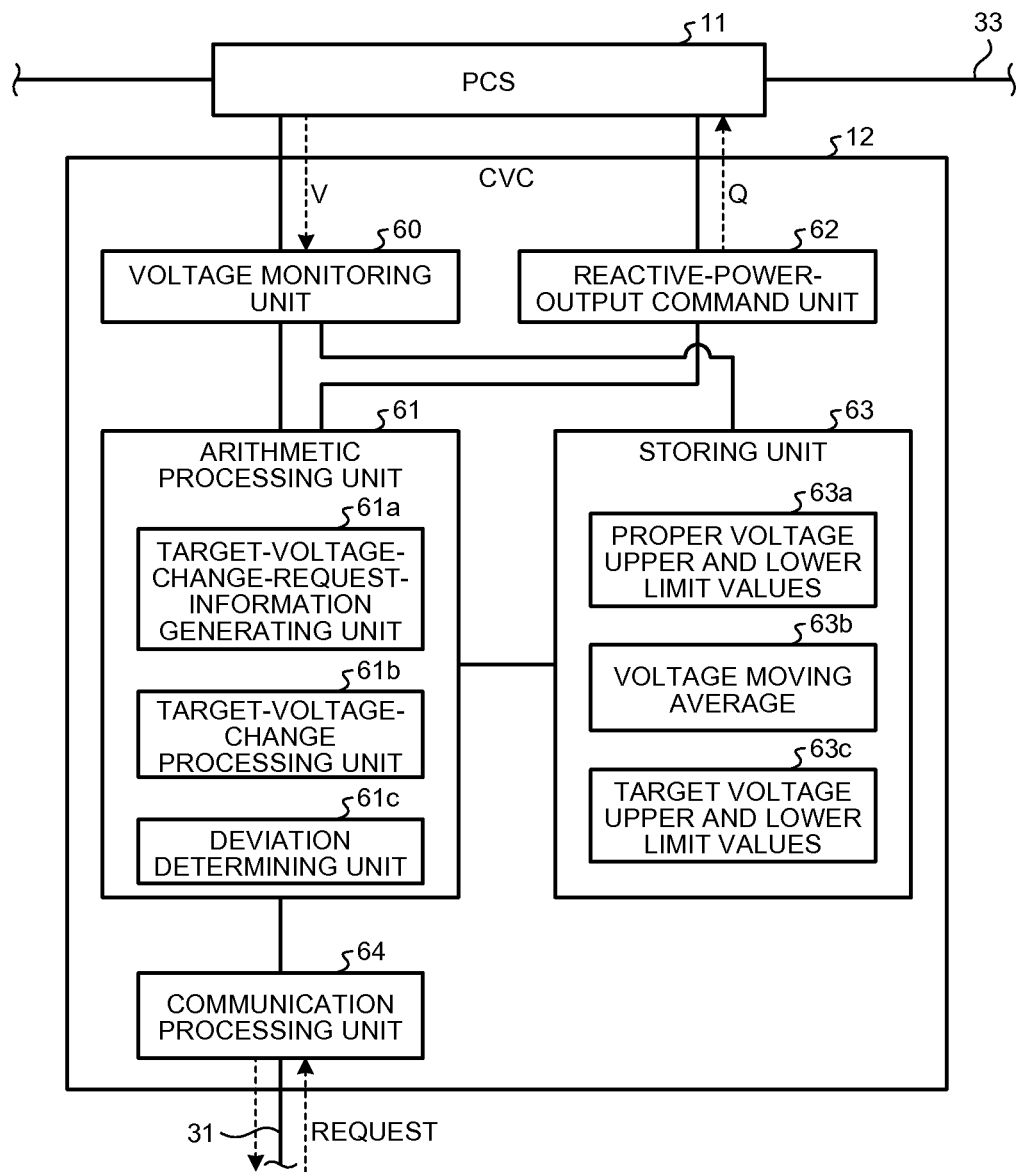
FIG. 4 is a diagram of an example of the configuration of a cooperative voltage controller (CVC) 12.

FIG. 4 is a diagram of an example of the configuration of the cooperative voltage controller (CVC) 12. As shown in FIG. 4, the cooperative voltage controller (CVC) 12 includes a voltage monitoring unit 60, an arithmetic processing unit 61, a reactive-power-output command unit 62, a storing unit 63, and a communication processing unit 64. The voltage monitoring unit 60, the arithmetic processing unit 61, and the communication processing unit 64 have the same functions as the functions of the voltage monitoring unit 50, the arithmetic processing unit 51, and the communication processing unit 54 shown in FIG. 3, respectively. In particular, a target-voltage-change-request-information generating unit 61a, a target-voltage-change processing unit 61b, and a deviation determining unit 61c, which are functional components of the arithmetic processing unit 61, have the same functions as the functions of the target-voltage-change-request-information generating unit 51a, the target-voltage-change processing unit 51b, and the deviation determining unit 51c, which are the functional components of the arithmetic processing unit 51 shown in FIG. 3, respectively. Proper voltage upper and lower limit values 63a, a voltage moving average 63b, and target voltage upper and lower limit values 63c stored in the storing unit 63 are the same as the proper voltage upper and lower limit values 53a, the voltage moving average 53b, and the target voltage upper and lower limit values 53c stored in the storing unit 53 shown in FIG. 3, respectively. Therefore, explanation is omitted concerning the voltage monitoring unit 60, the arithmetic processing unit 61, the storing unit 63, and the communication processing unit 64.

The deviation determining unit 61c determines whether a voltage measurement value output from the voltage monitoring unit 50 at, for example, every fixed cycle is within a range between the target voltage upper and lower limit values 53c. When the voltage measurement value deviates from the range, the deviation determining unit 61c generates a voltage command to maintain voltage within the target voltage upper and lower limit values 53c and outputs the voltage command to the reactive-power-output command unit 62. The reactive-power-output command unit 62 outputs the voltage command to the PCS 11 as a reactive power output command. The PCS 11 outputs reactive power Q according to the reactive power output command to perform control of voltage.

The configuration explained above is common to the cooperative voltage controllers (CVCs) of the reactive power type. That is, the same configuration as the configuration of the cooperative voltage controller (CVC) 12 shown in FIG. 4 applies to the cooperative voltage controllers (CVCs) 19 and 23.

An operation principle of the power-distribution-system-voltage control system according to this embodiment is explained. First, an operation principle of the cooperative voltage controller (CVC) and a voltage control apparatus of the cooperative voltage controller (CVC) is explained. As explained above, each of the cooperative voltage controllers (CVCs) retains two variable values, i.e., a target voltage upper limit value and a target voltage lower limit value.

The cooperative voltage controller (CVC) of the reactive power type monitors a voltage value at an end thereof at a short cycle (e.g., 100 millisecond cycle), compares the voltage value and the target voltage upper and lower limit values, and determines presence or absence of deviation. When the deviation continues, the cooperative voltage controller (CVC) adds a deviation amount to or subtracts the deviation amount from a control amount. When the deviation is absent, the cooperative voltage controller (CVC) resets a deviation amount. When the deviation amount exceeds a predetermined threshold, the cooperative voltage controller (CVC) gives a reactive power output command to a voltage controller such as a PCS through PID control to keep voltage within the target upper and lower limit values. Note that such control is executed by the deviation determining unit 61c (FIG. 4). The cooperative voltage controller (CVC) of the reactive power type includes a reactive power attenuating mechanism (not shown in the figure) that gradually reduces commanded reactive energy at a time constant of, for example, about 1 second and avoids a useless reactive power loss. The reactive power attenuating mechanism is realized as a function of the arithmetic processing unit 61 (FIG. 4).

Initial values (in a state in which there is no target voltage change request) of the target voltage upper and lower limit values of the cooperative voltage controller (CVC) of the reactive power type are values obtained by adding a fixed dead zone (e.g., 0.5% of the voltage moving average) to and subtracting the fixed dead zone from a moving average of a voltage measurement value at an end thereof. Consequently, in the state in which there is no target voltage change request, the cooperative voltage controller (CVC) of the reactive power type operates to avoid a sudden change in the voltage at the end.

The cooperative voltage controller (CVC) of the transformer type monitors a voltage value at an end thereof at a short cycle (e.g., 1 second cycle), compares the voltage value and the target voltage upper and lower limit values, and determines presence or absence of deviation. When the deviation continues, the cooperative voltage controller (CVC) adds a deviation amount to or subtracts the deviation amount from a control amount. When the deviation is absent, the cooperative voltage controller (CVC) resets a deviation amount. When the deviation amount exceeds a predetermined threshold, the cooperative voltage controller (CVC) gives a tap position change command to keep voltage within the target upper and lower limit values. Note that, to reduce the number of times of a tap operation, a threshold of an integral value for determining the deviation amount is set large compared with that of the cooperative voltage controller (CVC) of the reactive power type. Such control is executed by the deviation determining unit 51c (FIG. 3).

Initial values (in a state in which there is no target voltage change request) of the target voltage upper and lower limit values of the cooperative voltage controller (CVC) of the transformer type are values obtained by adding a fixed dead zone (e.g., 1% of the fixed value) to and subtracting the fixed dead zone from a predetermined fixed value or a fixed value determined according to a day of the week, a period of time, or the like. Consequently, the cooperative voltage controller (CVC) of the transformer type performs voltage maintenance in the state in which there is no target voltage change request concerning the power distribution system load side.

An operation principle of issuance of a target voltage change request in the cooperative voltage sensor (CVS) or the cooperative voltage controller (CVC) is explained. First, a voltage monitoring function of the cooperative voltage sensor (CVS) or the cooperative voltage controller (CVC) is explained.

Figure 5:
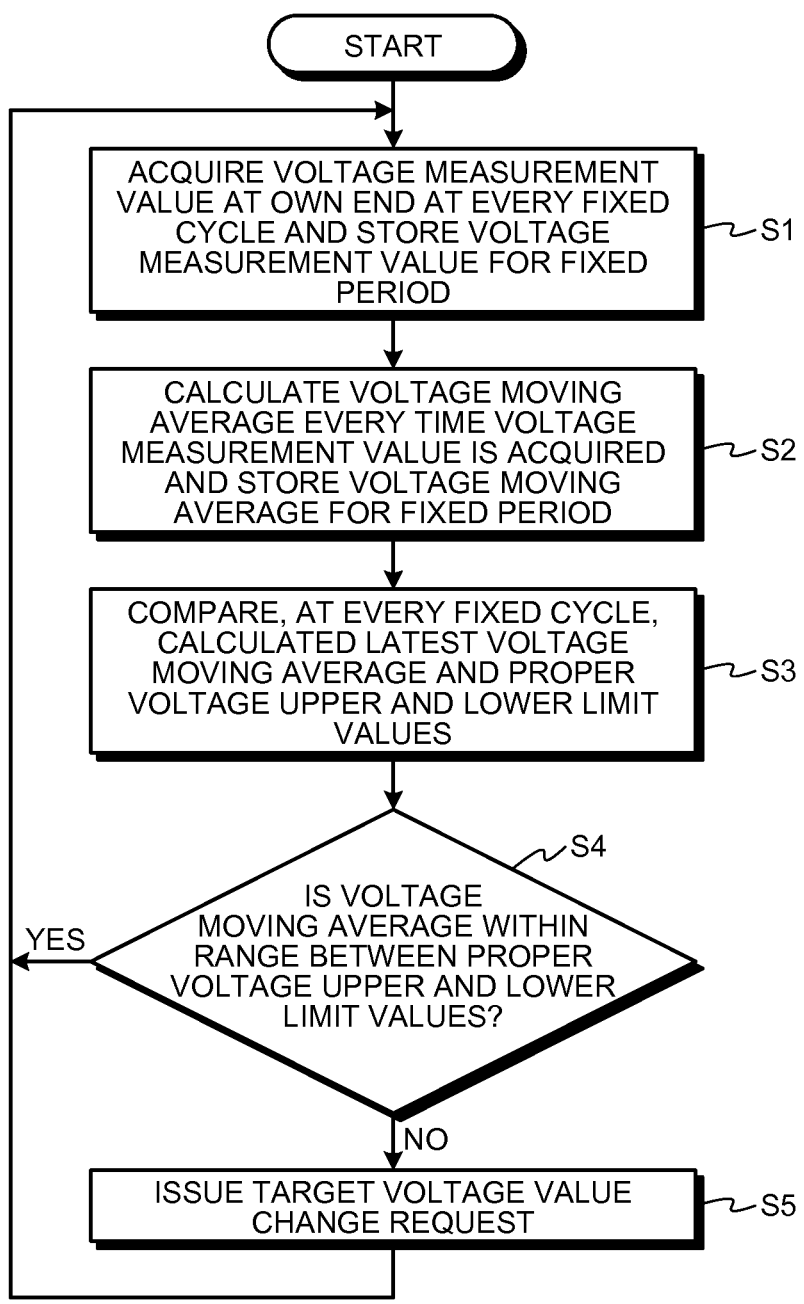
FIG. 5 is a flowchart for explaining processing for issuing a target voltage change request.

FIG. 5 is a flowchart for explaining processing of issuance of a target voltage change request. The cooperative voltage sensor (CVS) or the cooperative voltage controller (CVC) acquires a voltage measurement value at the end thereof at every fixed cycle (e.g., every 1 second cycle) and stores the voltage measurement value for a fixed period (e.g., 1 minute) (S1). Note that, because voltage fluctuates in millisecond units, the voltage measurement value is desirably an average of measurement values in, for example, 100 millisecond units. For example, in the cooperative voltage sensor (CVS) 8, the voltage monitoring unit 41 acquires a voltage measurement value at an end thereof and stores the voltage measurement value in the storing unit 43 for the fixed period. For example, in the cooperative voltage controller (CVC) 12, the voltage monitoring unit 60 acquires a voltage measurement value at an end thereof at every fixed cycle and stores the voltage measurement value in the storing unit 63 for the fixed period.

Every time the cooperative voltage sensor (CVS) or the cooperative voltage controller (CVC) acquires the voltage measurement value, the cooperative voltage sensor (CVS) or the cooperative voltage controller (CVC) calculates a voltage moving average (e.g., a voltage moving average for 1 minute) and stores the voltage moving average for the fixed period (e.g., 1 minute) (S2). For example, in the cooperative voltage sensor (CVS) 8, the target-voltage-change-request-information generating unit 42a calculates the voltage moving average 43b and stores the voltage moving average 43b in the storing unit 43 for the fixed period. For example, in the cooperative voltage controller (CVC) 12, the target-voltage-change-request-information generating unit 61a calculates the voltage moving average 63b and stores the voltage moving average 63b in the storing unit 63 for the fixed period.

The cooperative voltage sensor (CVS) or the cooperative voltage controller (CVC) retains the proper voltage upper and lower limit values (the proper voltage upper limit value and the proper voltage lower limit value). The cooperative voltage sensor (CVS) or the cooperative voltage controller (CVC) compares, at every fixed cycle (e.g., every 1 minute cycle), a calculated latest voltage moving average and the proper voltage upper and lower limit values (S3). When the voltage moving average deviates from the proper voltage upper or lower limit value (No at S4), the cooperative voltage sensor (CVS) or the cooperative voltage controller (CVC) issues a target voltage value change request (S5). For example, in the cooperative voltage sensor (CVS) 8, the target-voltage-change-request-information generating unit 42a performs the comparison processing. When the voltage moving average 43b is not within the proper voltage upper and lower limit values 43a, the target-voltage-change-request-information generating unit 42a generates target voltage change request information. For example, in the cooperative voltage controller (CVC) 12, the target-voltage-change-request-information generating unit 61a performs the comparison processing. When the voltage moving average 63b is not within the proper voltage upper and lower limit values 63a, the target-voltage-change-request-information generating unit 61a generates target voltage change request information. The target voltage change request information includes information concerning a voltage change amount and a voltage changing direction (an increasing or reducing direction of voltage). For example, when the voltage moving average deviates from the proper voltage upper limit value, the target-voltage-change-request-information generating unit 61a issues a request to reduce voltage. For the voltage change amount, it is appropriate to adopt a percentage notation taking into account communication between devices having different voltage classes. For example, about "deviation amount %+0.5%" is set. That is, in this case, the voltage change amount is set as a value corresponding to a ratio of the deviation amount to a latest voltage moving average. Note that the voltage moving average is used for the determination of the deviation from the voltage upper and lower limits to avoid unnecessary issuance of a target voltage change request due to a mustache-like voltage change in second units.

A target voltage changing operation of the cooperative voltage controller (CVC) that receives the target voltage change request is explained. Note that processing explained below is performed by not only the cooperative voltage controller (CVC) that receives a request but also the cooperative voltage controller (CVC) itself that issues the request. The cooperative voltage controller (CVC), which receives the request, changes the target voltage upper and lower limit values on the basis of the request and fixes the target voltage upper and lower limit values for a voltage cooperative control effective time (e.g., 1 hour) determined in advance concerning the cooperative voltage controllers (CVCs).

Figure 6:
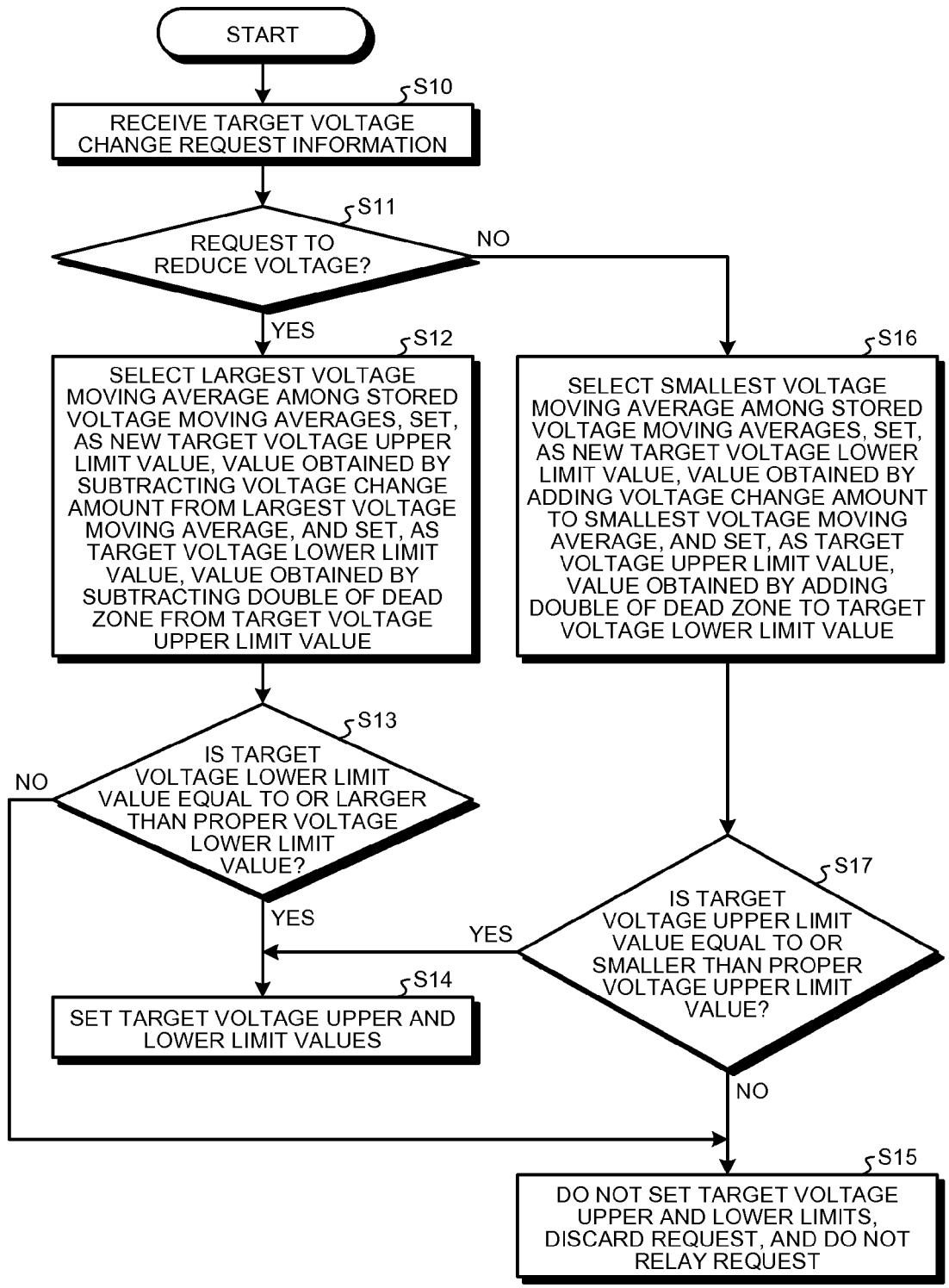
FIG. 6 is a flowchart for explaining processing for changing a target voltage by the cooperative voltage controller (CVC) that receives the target voltage change request.

A method of changing the target voltage upper and lower limit values of the cooperative voltage controllers (CVCs) is explained. FIG. 6 is a flowchart for explaining processing for a target voltage change by the cooperative voltage controller (CVC) that receives the target voltage change request. First, the cooperative voltage controller (CVC) receives target voltage change request information from the cooperative voltage sensor (CVS) or another cooperative voltage controller (CVC) (S10).

Subsequently, the cooperative voltage controller (CVC) discriminates whether content of the target voltage change request information is a request to reduce voltage or a request to increase voltage (S11). For example, when the request to reduce voltage is received (Yes at S11), the cooperative voltage controller (CVC) selects a largest moving average among a plurality of voltage moving averages stored in the storing unit (see FIGS. 3 and 4) at that point including a latest voltage moving average. The cooperative voltage controller (CVC) sets, as a new target voltage upper limit value, a value obtained by subtracting a voltage change amount from the largest voltage moving average (S12). At this point, to retain a fixed width between the target voltage upper and lower limit values, the cooperative voltage controller (CVC) sets the target voltage lower limit value to a value obtained by subtracting a double of a dead zone from the target voltage upper limit value (S12). However, when the target voltage lower limit value set in this way is smaller than the proper voltage lower limit value of the cooperative voltage controller (CVC) (No at S13), the cooperative voltage controller (CVC) does not change the target voltage upper and lower limit values, discards the request, and does not relay the request (S15). When the target voltage lower limit value is equal to or larger than the proper voltage lower limit value (Yes at S13), the cooperative voltage controller (CVC) performs setting of the target voltage upper and lower limit values set in this way (S14).

When the request to increase voltage is received (No at S11), the cooperative voltage controller (CVC) selects a smallest voltage moving average among a plurality of voltage moving averages stored in the storing unit (see FIGS. 3 and 4) at that point including a latest voltage moving average. The cooperative voltage controller (CVC) sets, as a new target voltage lower limit value, a value obtained by adding a voltage change amount to the smallest voltage moving average (S16). At this point, to retain a fixed width between the target voltage upper and lower limit values, the cooperative voltage controller (CVC) sets the target voltage lower limit value to a value obtained by adding a double of a dead zone to the target voltage lower limit value (S16). However, when the target voltage upper limit value set in this way exceeds the proper voltage upper limit value of the cooperative voltage controller (CVC) (No at S17), the cooperative voltage controller (CVC) does not change the target voltage upper and lower limit values, discards the request, and does not relay the request (S15). When the target voltage upper limit value is equal to or smaller than the proper voltage upper limit value (Yes at S17), the cooperative voltage controller (CVC) performs setting of the target voltage upper and lower limit values set in this way (S14).

Note that, after the voltage cooperative control effective time elapses after the request is received, the cooperative voltage controller (CVC) resets the target voltage upper and lower limit values to the initial values.

When a new target voltage change request is generated within the voltage cooperative control effective time, the cooperative voltage controller (CVC) performs a target voltage value change such that the later target voltage value overrides the previous target voltage value and further counts the voltage cooperative control effective time from a point of the change. However, to avoid congestion of the voltage cooperative operation, the cooperative voltage controller (CVC) sets a redundant operation prohibition time for each of the cooperative voltage sensors (CVSs) and the cooperative voltage controllers (CVCs). That is, the cooperative voltage sensor (CVS) does not issue (transmit) a new request before the redundant operation prohibition time (e.g., 10 seconds) elapses after issuing a request. The cooperative voltage controller (CVC) of the reactive power type does not perform new request issuance (transmission) or request reception before the redundant operation prohibition time (e.g., 1 minute) elapses after request issuance (transmission) or request reception. The cooperative voltage controller (CVC) of the transformer type does not perform new request issuance (transmission) or request reception before the redundant operation prohibition time (e.g., 30 minutes) elapses after request issuance (transmission) or request reception. Note that the redundant operation prohibition time is shorter than the voltage cooperative control effective time.

Figure 7:
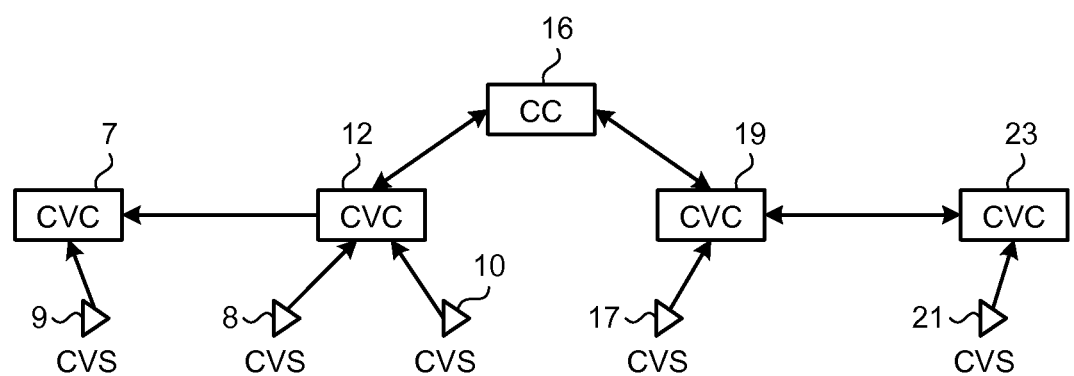
FIG. 7 is a diagram of an example of a communication path (a logical network) between the cooperative voltage sensors (CVSs) and the cooperative voltage controllers (CVCs).

A relay method for a request is explained. FIG. 7 is a diagram of an example of a communication path (a logical network) between the cooperative voltage sensor (CVS) and the cooperative voltage controller (CVC). In FIG. 7, arrows represent transmittable directions of the target voltage change request. A relay range of the target voltage change request is set to be kept within the same power distribution line. As it is seen from comparison of FIG. 7 and FIG. 1, the logical network includes a network configuration corresponding to an electrical connection configuration of the cooperative voltage sensor (CVS) group, the cooperative voltage controller (CVC) group, the connection controller (CC) 16, and the power distribution line group in the power distribution system shown in FIG. 1. That is, an arrangement configuration of the cooperative voltage sensor (CVS) group, the cooperative voltage controller (CVC) group, and the connection controller (CC) 16 corresponds to a connection relation thereof in the power distribution system.

The cooperative voltage sensor (CVS) does not receive the target voltage change request from the other cooperative voltage sensors (CVSs). When the cooperative voltage sensor (VCS) issues the target voltage change request, the cooperative voltage sensor (CVS) transmits the target voltage change request to one or a plurality of cooperative voltage controllers (CVCs) determined in advance. For example, cooperative voltage sensor (CVS) 21 transmits the target voltage change request to the cooperative voltage controller (CVC) 23. When the cooperative voltage controller (CVC) receives the target voltage change request from another cooperative voltage controller (CVC), the cooperative voltage controller (CVC) can transmit the target voltage change request to one or a plurality of other cooperative voltage controllers (CVCs) determined in advance. However, the cooperative voltage controller (CVC) does not transmit the target voltage change request to a transmission source. For example, when the cooperative voltage controller (CVC) 23 receives the target voltage change request from the cooperative voltage sensor (CVS) 21, the cooperative voltage controller (CVC) 23 transmits the target voltage change request to the cooperative voltage controller (CVC) 19. When the cooperative voltage controller (CVC) issues the target voltage change request by itself, the cooperative voltage controller (CVC) transmits the target voltage change request to one or a plurality of other cooperative voltage controllers (CVCs) determined in advance. For example, when the cooperative voltage controller (CVC) 19 issues the target voltage change request by itself, the cooperative voltage controller (CVC) 19 transmits the target voltage change request to the cooperative voltage controller (CVC) 23 and also transmits the target voltage change request to the cooperative voltage controller (CVC) 12 via the connection controller (CC) 16.

Figure 8:
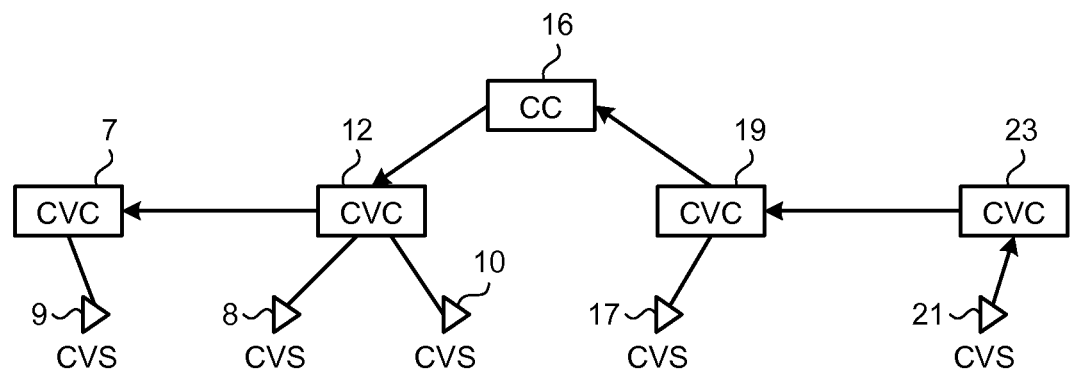
FIG. 8 is a diagram of an example of communication between the cooperative voltage sensors (CVSs) and the cooperative voltage controllers (CVCs).

FIG. 8 is a diagram of an example of communication between the cooperative voltage sensor (CVS) and the cooperative voltage controller (CVC). In FIG. 8, for example, the cooperative voltage sensor (CVS) 21 issues the target voltage change request. The cooperative voltage sensor (CVS) 21 generates the target voltage change request and transmits the target voltage change request to the cooperative voltage controller (CVC) 23. The cooperative voltage controller (CVC) 23 transmits the received target voltage change request to the cooperative voltage controller (CVC) 19. The cooperative voltage controller (CVC) 19 transmits the received target voltage change request to the connection controller (CC) 16. The connection controller (CC) 16 transmits the received target voltage change request to the cooperative voltage controller (CVC) 12. That is, the cooperative voltage controller (CVC) 19 transmits the received target voltage change request to the cooperative voltage controller (CVC) 12 via the connection controller (CC) 16. Further, the cooperative voltage controller (CVC) 12 transmits the received target voltage change request to the cooperative voltage controller (CVC) 7. In this way, the target voltage change request issued by the cooperative voltage sensor (CVS) 21 is sequentially transferred in a relay method by the cooperative voltage controller (CVC) and the connection controller (CC) 16 and notified to and spread over the cooperative voltage controllers (CVCs) 7, 12, 19, and 23.

Note that the cooperative voltage sensor (CVS), the cooperative voltage controller (CVC), and the connection controller (CC) 16 retain respective network addresses of transmission destinations of the target voltage change request. Setting of the network addresses is performed such that a relay range of the target voltage change request is kept within the same power distribution line. For example, the cooperative voltage sensor (CVS) 21 retains a network address of the cooperative voltage controller (CVC) 23 as a transmission destination. For example, the cooperative voltage controller (CVC) 19 retains respective network addresses of the cooperative voltage controller (CVC) 23 and the connection controller (CC) 16 as transmission destinations. Note that when the cooperative voltage controller (CVC) 19 issues the target voltage change request by itself and when the cooperative voltage controller (CVC) 19 receives the target voltage change request from the cooperative voltage sensor (CVS) 17, the cooperative voltage controller (CVC) 19 sets transmission destinations to the network addresses of the cooperative voltage controller (CVC) 23 and the connection controller (CC) 16 and sends the target voltage change request. When the cooperative voltage controller (CVC) 16 receives the target voltage change request from the cooperative voltage controller (CVC) 23 or the connection controller (CC) 16, the cooperative voltage controller (CVC) 16 sets a transmission destination to the network address other than the network address of the transmission source and sends the target voltage change request.

Note that, as shown in FIG. 7, the logical network is configured on the basis of the electrical connection, that is, concerning one power distribution line in which an increase and a decrease in voltage are directly associated. However, when it is likely that the electrical connection is changed according to a change in an opening and closing state of the switch or the breaker, the connection controller (CC) 16 is set to reflect the electrical connection change on the relay range of the target voltage change request. When the switch or the breaker is turned on, the connection controller (CC) 16 relays the target voltage change request. When the switch or the breaker is opened, the connection controller (CC) 16 discards the target voltage change request. For example, in a configuration in which another power distribution line (not shown in the figure) is connected to the power distribution bank 1 other than the power distribution line 2 in FIG. 1, it is also conceivable that the switch 15 of the power distribution line 2 is opened and a system portion on a load side of the switch 15 of the power distribution line 2 is connected to a system portion on the power distribution line power supply side of the other power distribution line. However, in such a case, a change in the electrical connection is reflected on the communication path by the connection controller (CC) 16, whereby a relay range of the target voltage change request appropriately reflects the connection of the power distribution system. The voltage cooperative control is effectively performed.

Transfer control by the cooperative voltage controller (CVC) of the transformer type is performed such that a relay of the target voltage change request is not performed between the power distribution line power supply side and the load side of the cooperative voltage controller (CVC) of the transformer type. For example, in FIG. 8, the cooperative voltage controller (CVC) 7 is the transformer type. However, even if another cooperative voltage controller (CVC) is present on the power distribution line power supply side of the SVR 6 on the power distribution line 2, the cooperative power controller (CVC) 7 does not relay the target voltage change request from the power distribution line power supply side to the load side and in the opposite direction.

In FIG. 7, an arrow directed from the cooperative voltage controller (CVC) 7 to the cooperative voltage controller (CVC) 12 is not shown. As explained above, this indicates that the cooperative voltage controller (CVC) of the transformer type does not issue the target voltage change request by itself and, even if the target voltage change request is received from the cooperative voltage sensor (CVS) 9, the cooperative voltage controller (CVC) of the transformer type does not relay the target voltage change request to the cooperative voltage controller (CVC) 12.

Figure 9:
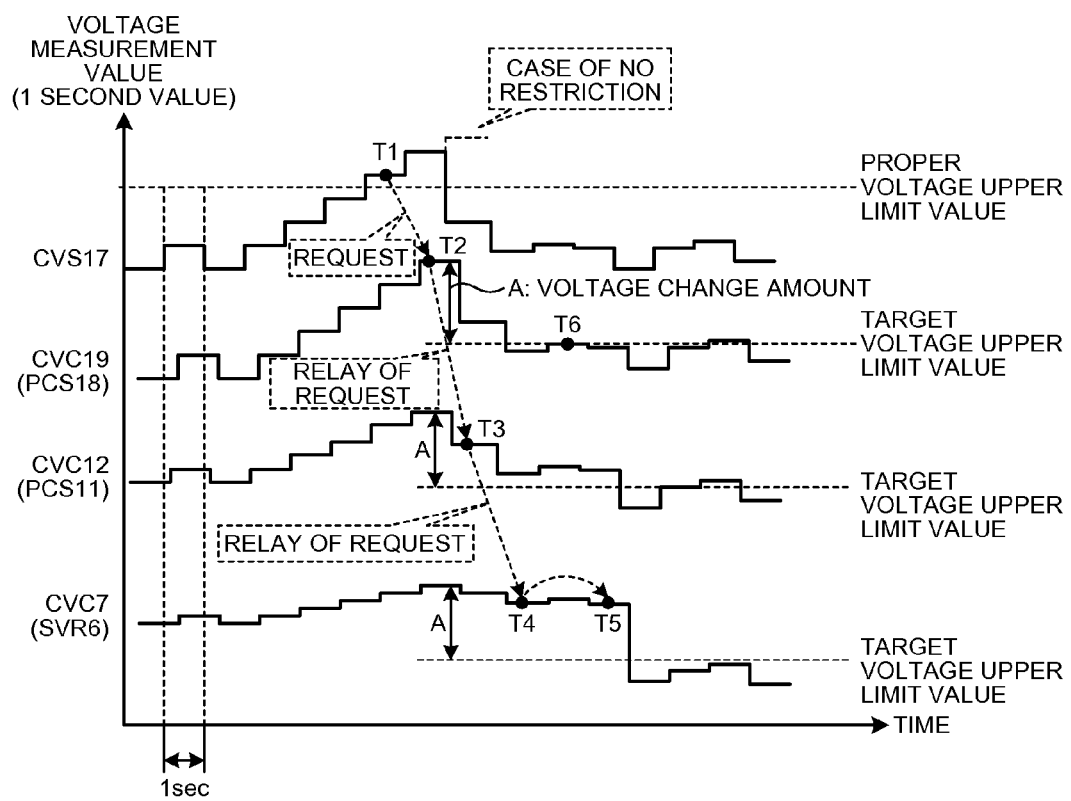
FIG. 9 is a schematic diagram of an example of the operation of the entire power-distribution-system voltage control system according to the embodiment.

An operation example of the entire power-distribution-system voltage control system according to this embodiment is explained. FIG. 9 is a schematic diagram of an example of the operation of the entire power-distribution-system voltage control system according to this embodiment.

In FIG. 9, the abscissa represents time and the ordinate represents a voltage measurement value. The operations of the CVS 17, the CVC 19 (the PCS 18), the CVC 12 (the PCS 11), and the CVC 7 (the SVR 6) are shown. The voltage measurement value on the ordinate is, for example, an average in one second. Note that, to simplify explanation, conditions explained below are set. First, the devices operate on the basis of a voltage moving average in one second. That is, the voltage measurement value (a one second value) is directly set as the voltage moving average. About one second is required for communication among the devices. The devices are not synchronized. Therefore, update timing (one second) for the voltage measurement value is different among the devices. A situation is assumed in which the CVC 19 can sufficiently observe the target voltage upper limit value only with the PCS 18. However, a situation is assumed in which the CVC 12 cannot observe the target voltage upper limit value only with the PCS 11 even if the reactive power output is maximized.

In FIG. 9, it is assumed that, for example, in sunny daytime, solar power generation increases. The voltage on the load side gradually increases in the high voltage system of the power-distribution-system. In the CVS 17, at time T1, the voltage moving average exceeds the proper voltage upper limit value and deviation from the proper voltage range is detected. Therefore, the CVS 17 issues the target voltage change request in a direction in which voltage is reduced.

The CVC 19 (the PCS 18) receives the target voltage change request from the CVS 17 and selects largest one out of a voltage moving average at that point (time T2) and stored past voltage moving averages. The CVC 19 (the PCS 18) sets, as a new target voltage upper limit value, a value obtained by subtracting a voltage change amount A from the largest value. Therefore, at time T2 and subsequent time, the voltage measurement value decreases and is controlled to be equal to or smaller than the target voltage upper limit value. Note that, at time T6, voltage tends to return to the target voltage upper limit value. The CVC 19 transmits the target voltage change request to the CVC 12.

The CVC 12 (the PCS 11) receives the target voltage change request and selects largest one out of a voltage moving average at that point (time T3) and the stored past voltage moving averages. The CVC 12 (the PCS 11) sets, as a new target voltage upper limit value, a value obtained by subtracting the voltage change amount A from the largest value. Therefore, at time T3 and subsequent time, the voltage measurement value decreases and is controlled to be equal to or smaller than the target voltage upper limit value.

The CVC 7 (the SVR 6) receives the target voltage change request and selects largest one out of a voltage moving average at that point (time T4) and the stored past voltage moving averages. The CVC 7 (the SVR 6) sets, as a new target voltage upper limit value, a value obtained by subtracting the voltage change amount A from the largest value. Note that the SVR 6 requires, for example, two seconds or more from time (time T4) when the CVC 7 receives the target voltage change request until the CVC 7 completes a tap operation thereof (T5). Therefore, at time T5 and subsequent time, the voltage measurement value decreases and is controlled to be equal to or smaller than the target voltage upper limit value.

Note that a method of changing the target voltage lower limit value is as explained with reference to FIG. 6. Explanation of the method is omitted.

As explained above, according to this embodiment, the cooperative voltage controllers (CVCs) and the cooperative voltage sensors (CVSs) connected to the same power distribution line are communicably connected. When the target voltage change request is notified, the cooperative voltage controllers (CVCs) perform voltage control in cooperation with one another. Therefore, it is possible to realize the voltage control among the cooperative voltage controllers (CVCs) without using the centralized voltage controller unlike the past.

In this embodiment, in carrying out the cooperative voltage control, the target voltage change request information is only transmitted and received between the cooperative voltage controllers (CVCs) and the cooperative voltage sensors (CVSs). Unlike the configuration in the past in which the centralized voltage controller (see, for example, Patent Literature 1), it is unnecessary to periodically collect measurement information of electric current and voltage from the points of the power distribution system. Therefore, a communication load is reduced and it is unnecessary to provide a high-speed communication network, a high-speed server, and the like. Therefore, costs are also reduced.

In this embodiment, the communication path between the cooperative voltage controllers (CVCs) and the cooperative voltage sensors (CVSs) is configured to correspond to the electrical connection configuration of the power distribution system as shown in FIG. 7 and FIG. 8. The transmission of the target voltage change request information is sequentially performed in the relay method. Therefore, the communication load is further reduced. Even when a cooperative voltage controller (CVC) or a cooperative voltage sensor (CVS) is added to the power distribution system anew, it is easy to set a communication network.

Note that, in this embodiment, for example, the distributed power supply by the solar power generation is connected to the low-voltage system of the power distribution system as the distributed power supply. However, the same applies when a distributed power supply other than the distributed power supply by the solar power generation is connected. In this embodiment, the transmission of the target voltage change request information is performed in the relay method. However, the target voltage change request information can also be transmitted not in the relay method.

INDUSTRIAL APPLICABILITY

As explained above, the present invention is useful as a power-distribution-system voltage control system.

REFERENCE SIGNS LIST

1 Power distribution bank
2, 32 to 34 Power distribution lines
3 Breaker
4, 14 Transformers
5 Load
8 Power distribution line
15 Switch
29 Bus
30 Communication network
31 Network cable
40 Voltage measuring unit
41, 50, 60 Voltage monitoring unit
42, 61 Arithmetic processing units
42a, 51a, 61a Target-voltage-change-request-information generating units
43, 53, 63 Storing units
43a, 53a, 63a Proper voltage upper and lower limit values
43b, 53b, 63b Voltage moving averages
44, 54, 64 Communication processing units
51 Arithmetic processing unit
51b, 61b Target-voltage-change processing unit
51c, 61c Deviation determining unit
52 Tap-position-change command unit
53c, 63c Target voltage upper and lower limit values
62 Reactive-power-output command unit

The invention claimed is:
1. A power-distribution-system voltage control system comprising:

a plurality of voltage control apparatuses connected to a high-voltage power distribution line connected to a transformer for power distribution and a low-voltage power distribution line connected to the high-voltage power distribution line via a transformer, the voltage control apparatuses each controlling voltage;

voltage controllers connected to the respective voltage control apparatuses, each of the voltage controllers acquiring, at every fixed cycle, a voltage measurement value at an end thereof measured by the corresponding voltage control apparatus and storing the voltage measurement value for a fixed period, adjusting a control amount of the corresponding voltage control apparatus so that the voltage measurement value is maintained within a range between a target voltage upper limit value and a target voltage lower limit value set in advance, being capable of generating and sending target voltage change request information for requesting the voltage controllers other than itself to change respective target voltage upper limit values and target voltage lower limit values when a latest voltage moving average calculated using a latest voltage measurement value and stored voltage measurement values deviates from a range between a proper voltage upper limit value and a proper voltage lower limit value, and changing the target voltage upper limit value and the target voltage lower limit value thereof according to content of target voltage change request information when the voltage controller receives the target voltage change request information from an outside thereof or itself generates the target voltage change request information;

a plurality of voltage sensors connected to at least the high-voltage power distribution line, each of the voltage sensors measuring voltage at an end thereof at every fixed cycle and storing a voltage measurement value for a fixed period and generating and transmitting target voltage change request information for requesting the voltage controllers to change the respective target voltage upper limit values and the respective target voltage lower limit values when a latest voltage moving average calculated using a latest voltage measurement value and stored voltage measurement values deviates from a range between a proper voltage upper limit value and a proper voltage lower limit value set in advance; and a communication network connecting the voltage controllers and the voltage sensors to allow them to communicate with each other, wherein when the target voltage change request information is generated and sent in any of the voltage controllers and the voltage sensors, the target voltage change request information is transferred between the voltage controllers via the communication network to be spread over all the voltage controllers.

2. The power-distribution-system voltage control system according to claim 1, wherein the target voltage change request information includes information concerning a voltage change amount and a voltage changing direction.

3. The power-distribution-system voltage control system according to claim 2, wherein the voltage change amount is set on the basis of a ratio of a deviation amount of the latest voltage moving average from a proper voltage range specified by the proper voltage upper limit value and the proper voltage lower limit value to the latest voltage moving average.

4. The power-distribution-system voltage control system according to claim 2, wherein the voltage controller calculates the voltage moving average every time the voltage measurement value is acquired and stores the voltage moving average for a fixed period, when the voltage controller receives the target voltage change request information or generates the target voltage change request information by itself and when content of the target voltage change request information is request content for reducing voltage, selects a largest voltage moving average among a plurality of voltage moving averages stored at that point including a latest voltage moving average, sets, as a new target voltage upper limit value, a value obtained by subtracting, from the largest voltage moving average, a voltage change amount obtained from the target voltage change request information and sets, as a new target voltage lower limit value, a value obtained by subtracting a double of a dead zone set in advance from the target voltage upper limit value, when the content of the target voltage change request information is request content for increasing the voltage, selects a smallest voltage moving average among the voltage moving averages, sets, as a new target voltage lower limit value, a value obtained by adding a voltage change amount obtained from the target voltage change request information to the smallest voltage moving average, and sets, as a new target voltage upper limit value, a value obtained by adding the double of the dead zone to the target voltage lower limit value.

5. The power-distribution-system voltage control system according to claim 4, wherein, when the content of the target voltage change request information is the request content for reducing the voltage and when a new target voltage lower limit value is smaller than the proper voltage lower limit value or when the content of the target voltage change request information is the request content for increasing the voltage and a new target voltage upper limit value exceeds the proper voltage upper limit value, the voltage controller discards the target voltage change request information without changing the target voltage upper limit value and the target voltage lower limit value.

6. The power-distribution-system voltage control system according to claim 1, wherein the voltage controller, which receives the target voltage change request information from the outside thereof or generates the target voltage change request information by itself, fixes the target voltage upper limit value and the target voltage lower limit value after the change until a voltage cooperative control effective time set in advance elapses after the target voltage upper limit value and the target voltage lower limit value are changed according to the content of the target voltage change request information.

7. The power-distribution-system voltage control system according to claim 6, wherein
the voltage sensor does not transmit new target voltage change request information before a redundant operation prohibition time elapses after the voltage sensor transmits the target voltage change request information, and
the voltage controller does not transmit or receive new target voltage change request information before the redundant operation prohibition time elapses after the voltage controller transmits or receives the target voltage change request information.

8. The power-distribution-system voltage control system according to claim 7, wherein, even within the voltage cooperative control effective time, after the redundant operation prohibition time elapses, when the voltage controller receives the target voltage change request information from the outside thereof or generates the target voltage change request information by itself anew, the voltage controller changes the target voltage upper limit value and the target voltage lower limit value on the basis of the new target voltage change request information.

9. The power-distribution-system voltage control system according to claim 1, wherein the voltage control apparatuses include a voltage controller of a transformer type that controls a voltage control apparatus of the transformer type and a voltage controller of a reactive power type that controls a voltage control apparatus of a reactive power adjustment type.

10. The power-distribution-system voltage control system according to claim 9, wherein, even when the voltage controller of the transformer type receives the target voltage change request information from the outside thereof or generates the target voltage change request information by itself, the voltage controller of the transformer type does not transmit the target voltage change request information to the other voltage controllers.

11. The power-distribution-system voltage control system according to claim 1, wherein an arrangement configuration of the voltage controllers and the voltage sensors in the communication network corresponds to an electrical connection relation between the voltage controllers and the voltage sensors in a power distribution system.

12. The power-distribution-system voltage control system according to claim 11, wherein
each of the voltage sensors includes network addresses of one or a plurality of the voltage controllers set in advance as transmission destinations of the target voltage change request information, and
each of the voltage controllers includes network addresses of one or a plurality of the voltage controllers set in advance as transmission destinations of the target voltage change request information.

13. The power-distribution-system voltage control system according to claim 12, wherein
a switch or a breaker is provided on the high-voltage power distribution line, and
a connection controller is connected to the switch or the breaker, the connection controller being connected to the communication network and arranged on a communication path between two voltage controllers among the voltage controllers in the communication network and interrupting or relaying communication between the two voltage controllers according to an opening and closing state of the switch or the breaker.

14. The power-distribution-system voltage control system according to claim 1, wherein a voltage control apparatus connected to a distributed power supply and a voltage controller that controls the voltage control apparatus are connected to the low-voltage power distribution line.

15. The power-distribution-system voltage control system according to claim 14, wherein the distributed power supply is based on solar power generation, and the voltage control apparatus is a power conditioning system for solar power generation.

16. A voltage controller in a system including a plurality of voltage control apparatuses connected to a power distribution line, voltage controllers connected to the respective voltage control apparatuses, each of the voltage controllers acquiring a voltage measurement value at an end thereof measured by the voltage control apparatus and adjusting a control amount of the voltage control apparatus such that the voltage measurement value is maintained within a range between a target voltage upper limit value and a target voltage lower limit value set in advance, a plurality of voltage sensors connected to the power distribution line and measuring voltage at respective ends of the voltage sensors, and a communication network connecting the voltage controllers and the voltage sensors to allow them to communicate with each other, the voltage controller comprising:
a target-voltage-change-request-information generating unit to generate target voltage change request information for requesting a change of the target voltage upper limit value and the target voltage lower limit value when a voltage moving average calculated using the voltage measurement value at the end of the own voltage controller deviates from a proper voltage upper limit value or a proper voltage lower limit value set in advance;
a communication processing unit to receive the target voltage change request information transmitted from a voltage sensor or a voltage controller other than the own voltage controller via the communication network when a voltage moving average calculated using the voltage measurement value by that voltage sensor or that voltage controller deviates from the range of a proper voltage upper limit value or a proper voltage lower limit value; and
a target-voltage-change processing unit to change, when the own voltage controller receives the target voltage change request information from an outside of the own voltage controller or the own voltage controller generates the target voltage change request information, the target voltage upper limit value and the target voltage lower limit value of the own voltage controller according to content of the target voltage change request information,
wherein the communication processing unit transmits the target voltage change request information received from the outside of the own voltage controller or generated by the own voltage controller to a predetermined voltage controller other than the own voltage controller via the communication network.

* * * * *